United States Patent [19]

Kotani et al.

[11] Patent Number: 4,750,047
[45] Date of Patent: Jun. 7, 1988

[54] FOLDING FACSIMILE

[75] Inventors: Matahira Kotani; Masafumi Matsumoto; Ryoichi Kawai, all of Nara; Kenichi Shiraishi, Yamatokoriyama, all of Japan

[73] Assignee: Sharp Kabushiki Kaisha, Osaka, Japan

[21] Appl. No.: 922,270

[22] Filed: Oct. 24, 1986

[30] Foreign Application Priority Data

Oct. 25, 1985 [JP] Japan ................................ 60-239687

[51] Int. Cl.⁴ ............................................. H04N 1/00
[52] U.S. Cl. .................................... 358/286; 358/285
[58] Field of Search ................................ 358/285, 286

[56] References Cited

U.S. PATENT DOCUMENTS

| | | | |
|---|---|---|---|
| 4,476,496 | 10/1984 | Thaler | 358/286 |
| 4,496,984 | 1/1985 | Stoffel | 358/286 |
| 4,542,414 | 9/1985 | Nagane | 358/285 |
| 4,649,437 | 3/1987 | Watanabe | 358/286 |

FOREIGN PATENT DOCUMENTS

| | | |
|---|---|---|
| 1156962 | 3/1967 | United Kingdom . |
| 1222117 | 2/1968 | United Kingdom . |
| 1277284 | 8/1969 | United Kingdom . |
| 1339618 | 4/1971 | United Kingdom . |
| 1402151 | 11/1972 | United Kingdom . |
| 2015846A | 2/1979 | United Kingdom . |

Primary Examiner—Howard W. Britton
Attorney, Agent, or Firm—Birch, Stewart, Kolasch & Birch

[57] ABSTRACT

A folding facsimile whose main body is divided into a transmitter and a receiver which are joined by a rotatable connector so as to allow the main body to be folded. Constructed to be foldable, the facsimile of G3 or higher standard has become compact and portable.

3 Claims, 1 Drawing Sheet

FOLDING FACSIMILE

BACKGROUND AND SUMMARY OF THE INVENTION

The present invention relates to a digital folding facsimile of a transceiver type which incorporates a transmitter and a receiver in one body and meets the requirements of G3 or higher standards.

With recent popularization, facsimile has been remarkably reduced in size. Analog type facsimile is now small enough to be portable. On the other hand, known digital type facsimile of G3 or higher standard is inevitably large because of its structural and transmission time requirements. It is only recently that the digital facsimile of desk top size has come to be prevailing. The desk top size digital facsimile is mostly of the transceiver type incorporating a transmitter and a receiver in one body.

As mentioned above, the known digital type facsimile of G3 or higher standard has been reduced in size only to the extent of desk top size and it is not yet small enough to be portable.

In view of the foregoing, the foremost object of the present invention is to provide a portable folding facsimile of digital type that meets the requirements of G3 or higher standard. Thus, the present invention provides a portable folding facsimile which was not present in the prior art.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

To achieve the above object, according to the present invention, the facsimile main body is divided into two portions: a transmitter and a receiver, and the two portions are joined at their respective ends by a rotatable connector so that the equipment is foldable at the joint.

BRIEF DESCRIPTION OF THE DRAWINGS

The present invention will be better understood from the detailed description given hereinbelow and the accompanying drawings which are given by way of illustration only, and thus are not limitative of the present invention and wherein.

DESCRIPTION OF THE PREFERRED EMBODIMENTS

Figure 1:
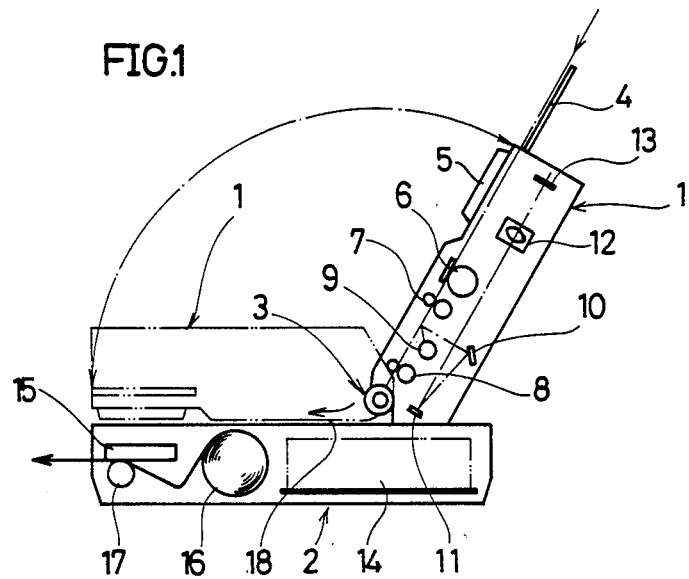
FIG. 1 is a side view of an embodiment of a folding facsimile of the present invention.
Figure 2:
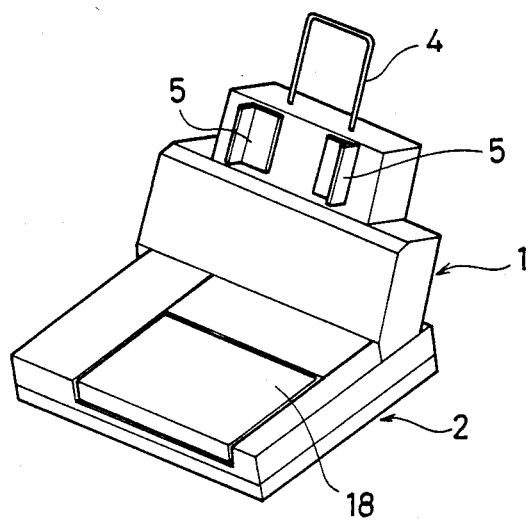
FIG. 2 is a perspective view of the folding facsimile of FIG. 1.

FIGS. 1 and 2 are right side view and perspective view, respectively, of an embodiment of the present invention. As shown, unlike the conventional rectangular parallelepiped type, the facsimile of the present invention is divided into a transmitter 1 and a receiver 2 which are joined at their respective ends by a rotatable hinged connector 3, so that the transmitter 1 is rotatable with respect to the receiver 2 within the range between the raised position indicated by solid lines and the laid position indicated by the chain double-dashed lines.

Downwardly along the document travelling route on the transmitter 1 in the raised position are mounted a document support guide 4, a pair of hopper guides 5 for truing up the side edges of a plurality of documents, a separator 6 for feeding the plurality of documents one by one sheet, and primary and secondary document transport rollers 7 and 8. To read a document, the transmitter 1 further contains a document illuminating light source 9 such as a fluorescent lamp or a semiconducting light emitter array provided at the reading position between the transport rollers 7 and 8, two mirrors 10 and 11 for redirecting the course of light reflected from the document, an image-forming lens 12 and a reading element 13 for converting the optical signal of an image to an electric signal and transmitting it to a controller 14.

The receiver 2 contains the controller 14 which demodulates a transmitted picture signal by a modem and transmits it to the recording block. In the recording block of the receiver 2 are mounted a recording thermal head 15 and a platen roller 17 which transports thermal recording paper 16 by pressing it against the thermal head 15. The picture signal is thermally transcribed from the thermal head 15 onto the thus transported thermal recording paper 16. The top surface of the receiver 2 serves as a document receiving tray 18.

Operation of the facsimile of the above construction is described now. Since transmitting and receiving operations of the present invention are similar to those of the conventional facsimile, they are only briefly described here.

A plurality of document sheets supplied through the document inlet are trued up on their side edges by the document support guide 4 and hopper guides 5, and fed one by one sheet by the separator 6 to the recording block where the document is illuminated by the light source 2. Light reflected from the document is redirected by the two mirrors 10 and 11 and passes through the lens 12 to form an image on the reading element 13. The reading element 13 converts the picture signal to an electric signal and transmits it through the modem of the controller 14.

Picture signal, when received, is demodulated by the modem of the controller 14 and sent to the recording block where the picture signal is recorded on the thermal recording paper 16 by the thermal head 15.

When operated, the transmitter 1 is held in the raised position at a tilting angle most convenient for operation. After passing the reading block, the documents are transported by the secondary transport rollers 8 onto the top surface of the receiver 2 which serves as the document receiving tray 18.

When the equipment is folded by rotating the transmitter 1 along the chain line of FIG. 1 and laying it over the receiver 2 as indicated by the chain double-dashed line, it is possible to carry it in a carrying case (not shown).

As a portable facsimile, the equipment of the present invention uses a battery (not shown) as a driving power source, enabling the facsimile to be operated at any desired place even if there is no commercial power supply available.

The invention being thus described, it will be obvious that the same may be varied in many ways. Such variations are not to be regarded as a departure from the spirit and scope of the invention, and all such modifications are intended to be included within the scope of the following claims.

What is claimed is:

1. A folding facsimile comprising
a transmitter,
a receiver,
means connecting said transmitter and said receiver together in a first position and a second position,
said first position locating said transmitter at an obtuse angle to said receiver,
said second position having said transmitter folded over said receiver,
said means including a rotatably hinged connector between said transmitter and said receiver, and
said facsimile being operative with said transmitter and said receiver in said first position and being inoperative with said transmitter and said receiver in said second position.

2. The folding facsimile of claim 1 further comprising a document receiving tray located on a top surface of said receiver, and
said transmitter including a document outlet facing said document receiving tray.

3. The folding facsimile of claim 2 wherein a battery is provided as a power source.